(12) United States Patent
Watanabe et al.

(10) Patent No.: US 7,357,330 B2
(45) Date of Patent: *Apr. 15, 2008

(54) SEMICONDUCTOR INTEGRATED CIRCUIT DEVICE AND CONTACTLESS IC CARD

(75) Inventors: Kazuki Watanabe, Kokubunji (JP);
Yutaka Nakadai, Yachiyo (JP);
Shinichi Ozawa, Hachioji (JP)

(73) Assignee: Renesas Technology Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/432,378

(22) Filed: May 12, 2006

(65) Prior Publication Data

US 2006/0202043 A1    Sep. 14, 2006

Related U.S. Application Data

(63) Continuation of application No. 11/028,043, filed on Jan. 4, 2005, now Pat. No. 7,044,393.

(30) Foreign Application Priority Data

Feb. 5, 2004    (JP)    ............................. 2004-028823

(51) Int. Cl.
*G06K 19/06*    (2006.01)

(52) U.S. Cl. ...................................... 235/492; 235/487

(58) Field of Classification Search ................ 235/491, 235/493, 486, 487, 380, 383, 384, 381, 375, 235/449; 340/10.34, 10.52, 825.7, 572.7
See application file for complete search history.

(56) References Cited

U.S. PATENT DOCUMENTS

| 4,857,893 | A | 8/1989 | Carroll |
| 5,308,968 | A | 5/1994 | Yamaguchi |
| 5,315,260 | A | 5/1994 | Link et al. |
| 5,326,965 | A | 7/1994 | Inoue |
| 5,652,423 | A | 7/1997 | Saitoh et al. |
| 5,694,074 | A | 12/1997 | Kitade et al. |
| 5,734,333 | A | 3/1998 | Levionnais |
| 5,801,372 | A | 9/1998 | Yamaguchi |

(Continued)

FOREIGN PATENT DOCUMENTS

CN    1039938 A    1/1990

(Continued)

*Primary Examiner*—Thien Minh Le
(74) *Attorney, Agent, or Firm*—Mattingly, Stanger, Malur & Brundidge, PC

(57) ABSTRACT

A semiconductor integrated circuit device (IC) and a contactless IC card including a receiver circuit that is able to stably demodulate information signals superimposed on AC signals from an interrogator. The receiver circuit included in the IC is equipped with antenna terminals, a power supply circuit, and a filter circuit. The information signal from which a high frequency component was eliminated through the filter circuit is input via a capacitor to an inverting input terminal of an operational amplifier and a reference voltage is input to a non-inverting input terminal thereof. After the information signal is fed back through a feedback path to the non-inverting input terminal of the operational amplifier, that signal is amplified and the amplified information signal is binarised by a binarising circuit, thereby data transmitted from the interrogator is demodulated. The contactless IC card comprises an antenna coil and the IC including this receiver circuit.

16 Claims, 13 Drawing Sheets

U.S. PATENT DOCUMENTS

| | | |
|---|---|---|
| 5,804,811 A | 9/1998 | Saitoh et al. |
| 5,953,223 A | 9/1999 | Kato et al. |
| 6,229,723 B1 | 5/2001 | Umetsu et al. |
| 6,343,022 B1 | 1/2002 | Naruse |
| 7,044,393 B2 * | 5/2006 | Watanabe et al. ............ 235/492 |

FOREIGN PATENT DOCUMENTS

| | | |
|---|---|---|
| CN | 1291001 A | 4/2001 |
| JP | 11-168417 | 6/1999 |
| JP | 11-214960 | 8/1999 |

* cited by examiner

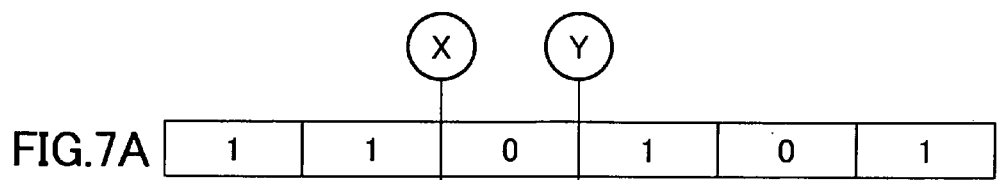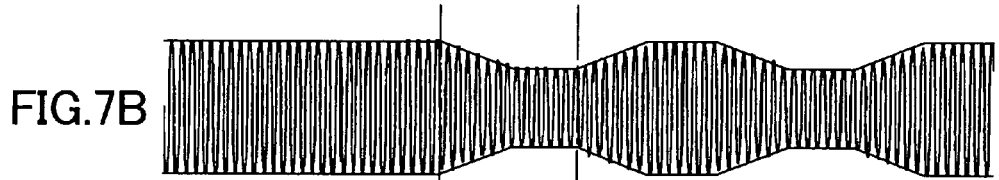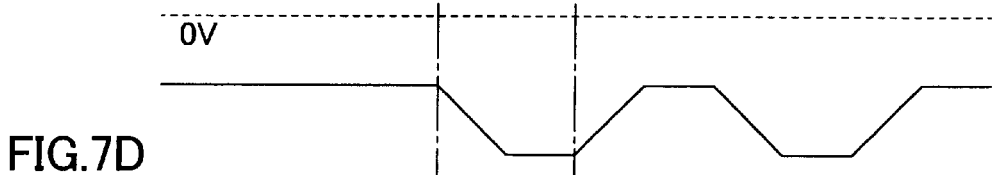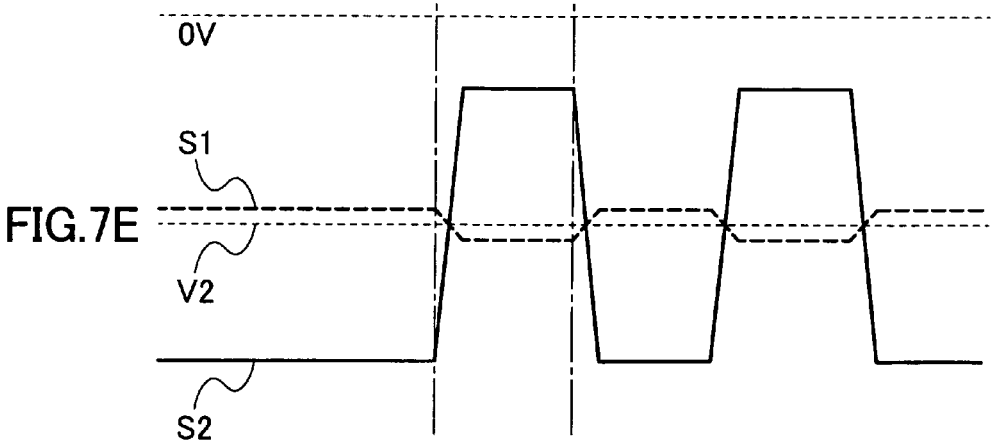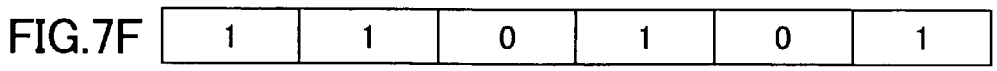

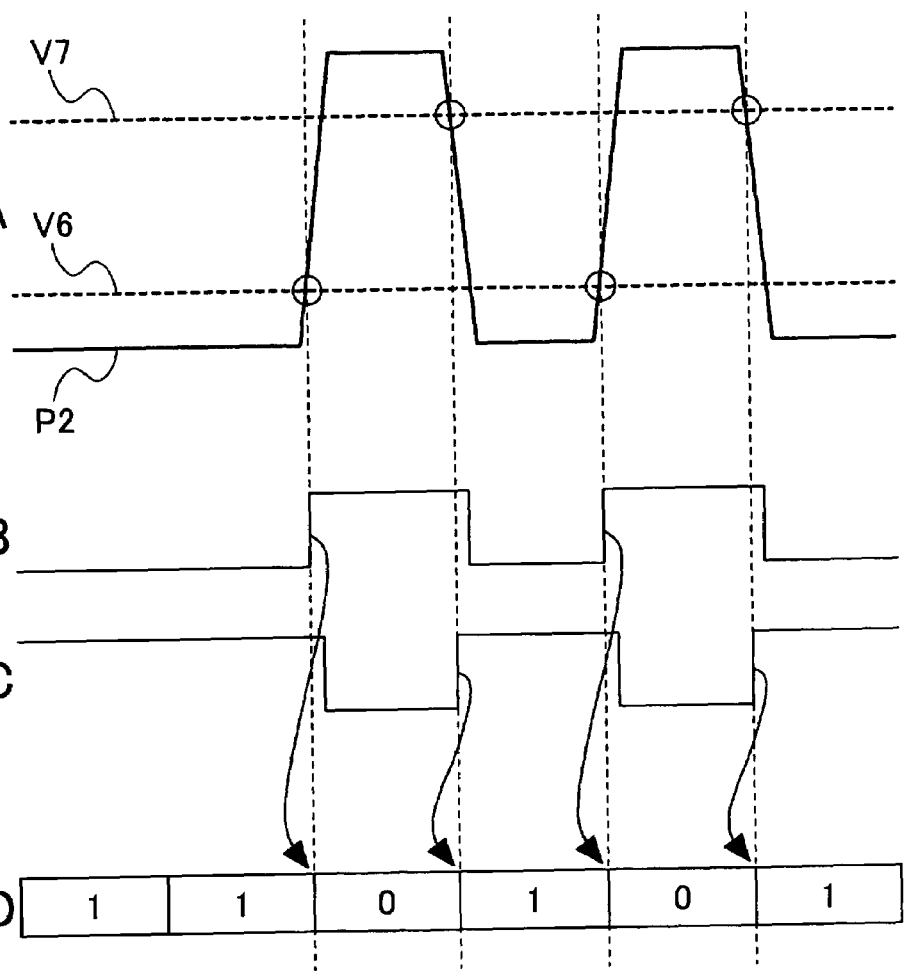

US 7,357,330 B2

SEMICONDUCTOR INTEGRATED CIRCUIT DEVICE AND CONTACTLESS IC CARD

This is a continuation application of U.S. Ser. No. 11/028,043, filed Jan. 4, 2005, now U.S. Pat. No. 7,044,393.

CLAIM OF PRIORITY

The present application claims priority from Japanese application serial no. 2004-028823, filed on Feb. 5, 2004, the content of which is hereby incorporated by reference into this application.

BACKGROUND OF THE INVENTION

1. Field of the Invention

The present invention relates to a semiconductor integrated circuit device and a contactless IC card and, in particular, to a technique suitable for a contactless IC card (hereinafter, simply referred to as an "IC card") and a receiver circuit of a semiconductor integrated circuit device that is mounted on the IC card.

2. Description of Related Art

A so-called IC card in which a semiconductor integrated circuit device and an antenna are mounted exchanges information with an interrogator and its semiconductor integrated circuit device and implements various functions such as transmitting data retained by it and storing data transmitted from the interrogator.

The semiconductor integrated circuit device mounted on the IC card receives an RF signal radioed from the interrogator by the antenna mounted on the contactless IC card, rectifies and smoothes the voltage produced across the antenna, and generates an internal voltage that is required for internal circuit operation.

Recently, demand for advanced functions of the IC card has been increased. For instance, a dual-type IC card with a contactless interface and terminals for input and output is typical of such advancement. With the advanced functions of the IC card, the consumption current of the semiconductor integrated circuit device mounted on the IC card increases. In consequence, it is becoming difficult to extend the communication distance between the IC card and the interrogator in operation via the contactless interface.

Meanwhile, in data transmission from the interrogator to the contactless IC card, an amplitude shift modulation scheme, so-called Amplitude Shift Keying (ASK) that modulates the amplitude of the RF signal is used, typically, in compliance with the ISO 14443 standard.

Conventionally, a demodulator for this kind of contactless chip card having the following structure is known: it is made up of a detector circuit including an antenna, a rectifying circuit which rectifies a detected signal, a bandpass filter which generates a low frequency signal and a high frequency signal from the rectified signal, a comparator stage which compares the low frequency signal and the high frequency signal applied to it, and a memory which stores the result of the comparison by the comparator stage (e.g., see patent document 1).

A comparator (Schmitt circuit) having hysteresis characteristics for use in the modulator is known and this circuitry is configured such that it detects a changing point on the envelope curve of a receive signal, determines a positive or negative direction of change occurring at the changing point, and sets the operating point higher than a reference potential by a predetermined potential for detecting the potential change of a signal that is applied to input and output terminals when data demodulation is performed (e.g., see patent document 2).

[Patent document 1] Japanese Patent No. 3177502
[Patent document 2] Japanese Patent Laid-Open No. H11-214960

SUMMARY OF THE INVENTION

FIG. 1 shows a current-voltage characteristic output from the terminals at both ends of the IC card's antenna that receives power in an electromagnetic wave form radioed from the interrogator. In FIG. 1, V on the ordinate is voltage and I on the abscissa is current. The characteristic line VL indicates that the voltage is equivalent to a voltage source Vo with output resistance Ro. Here, Vo is the voltage between the terminals of the antenna on the assumption that no current flows across the load connected between the antenna terminals and the voltage between the terminals of the antenna decreases, as current flows across the load connected between the antenna terminals. That is, the gradient of the voltage-current characteristic corresponds to the output resistance Ro.

FIG. 2 shows an example of a semiconductor integrated circuit device (IC) with a power supply circuit. FIGS. 3A-3G show the operating waveforms in the sections of the circuitry shown in FIG. 2. This IC comprises an antenna L1 and a capacitor C1 connected between the antenna terminals LA and LB, a rectifying circuit B1 consisting of diodes D1 to D4, and a power supply circuit consisting of a capacitor C2 between power supply terminals and a power supply load B2. Here, the characteristic line VL shown in FIG. 1 is obtained for the antenna shown in FIG. 2.

In FIGS. 3A-3G, FIG. 3A shows data that is transmitted from the interrogator; 3B shows an AC signal superimposed with the data output from the interrogator; 3C shows an output voltage V1 of the rectifying circuit B1; 3D shows a consumption current I1 across the power supply load B2; 3E shows a current I2 flowing across the capacitor C2 between power supply terminals; 3F shows an output current I3 of the rectifying circuit B1; and 3G shows the voltage produced between the antenna terminals LA and LB.

At a changing point X at which the data transmitted from the interrogator changes from "1" to "0," the voltage between the power supply terminals is held on the capacitor C2 between the power supply terminals, which stops sufficient forward voltage application to the diodes constituting the rectifying circuit B1 and, consequently, stops the output current I3 of the rectifying circuit B1. In the meantime, the power supply load B2 is activated by the charge stored on the capacitor C2 between the power supply terminals. Therefore, the charge stored on the capacitor C2 between the power supply terminals decreases, as it is consumed as the consumption current I1 across the power supply load B2, and the output voltage V1 lowers. In consequence, forward voltage application to the diodes constituting the rectifying circuit B1 gradually reverts and the output current I3 of the rectifying circuit B1 rises.

Conversely, at a changing point Y at which the data transmitted from the interrogator changes from "0" to "1," since the output voltage is low as above, a sufficient forward voltage is applied to the diodes constituting the rectifying circuit B1 and the output current I3 of the rectifying circuit B1 increases to the peak. This output current I3 activates the power supply load B2 and causes charge to be stored on the capacitor C2 between the power supply terminals. The above transitions are repeated at the changing points at which the data transmitted from the interrogate changes.

These waveform charts show that the output current I3 of the rectifying circuit B1 changes, influenced by the power supply load B2 and the capacitor C2 between the power supply terminals, and, consequently, the current flowing between the antenna terminals LA and LB changes. Due to this change in the current flowing between the antenna terminals and the output resistance Ro shown in FIG. 1, the voltage between the antenna terminals changes as shown in FIG. 3G.

In other words, this means that the increased current across the power supply load increases the charge on the capacitor between the power supply terminals, which is provided to reduce a ripple in the voltage between the power supply terminals, and, in consequence, a high frequency component is removed from an ASK signal which corresponds to the data transmitted from the interrogator.

Meanwhile, in an instance where the above-mentioned ASK modulation scheme is applied in data transmission from the interrogator to the contactless IC card, the demodulation circuit used in the receiver circuit detects a changing point on the envelope curve of a receive signal by a differentiation circuit, determines a positive or negative direction of change occurring at the changing point by the comparator having the hysteresis characteristics, and demodulates the data, as disclosed in the above patent documents 1 and 2. That is, this modulator is configured to detect a changing point in the high frequency component of the data signal. Therefore, as described for FIGS. 1 and 2, in the case where a high frequency component is removed from the data signal, influenced by the power supply load and others, only an extremely small change appears in the envelope curve at a data changing point. In consequence, a problem occurs in which it becomes impossible to detect the positive or negative direction of data change at the changing point and the IC card fails to receive data transmitted from the interrogator.

In fact, the problem with the IC card is that the characteristics of the rectifying circuit included in the IC card and the consumption current of an internal circuit that operates on the output voltage of the rectifying circuit have an effect that causes the removal of the high frequency component from an information signal superimposed on an AC signal radioed from the interrogator, thus making impossible to demodulate the data transmitted from the interrogator.

The object of the present invention is to provide a semiconductor integrated circuit device and a contactless IC card having a receiver circuit that enables stable demodulation of ASK-modulated signals radioed from the interrogator without being affected by other functions and the consumption current of a circuit included in the IC card and the capacitor or the like provided between the power supply terminals.

A typical aspect of the invention disclosed in this application will be briefly summarized as follows. A semiconductor integrated circuit device including a receiver circuit that demodulates an information signal superimposed on an AC signal received through an antenna is provided.

The receiver circuit comprises antenna terminals which are connected to the antenna; a rectifying circuit which rectifies and smoothes the AC signal fed from the antenna to the antenna terminals; a filter circuit which eliminates a high frequency component from an output signal of the rectifying circuit; a capacitor; an operational amplifier with a non-inverting input to which a first reference voltage is input; a feedback path; and a binarizing circuit, characterized in that an output signal of the filter circuit is input via the capacitor to an inverting input of the operational amplifier, and that an output signal of the operational amplifier is fed back through the feedback path to the inverting input terminal of the operational amplifier and then input to the binarizing circuit.

A contactless IC card according to the present invention is equipped with a coil that forms an antenna and the above semiconductor integrated circuit device, characterized in that the antenna is connected to the antenna terminals of the receiver circuit that is a constituent of said semiconductor integrated circuit device.

BRIEF DESCRIPTION OF THE DRAWINGS

FIGS. 7A-7F show waveform charts as examples of the operating waveforms in the sections of the receiver circuit shown in FIG. 6;

FIG. 14A-14D show waveform charts as examples of the operating waveforms in the sections of the binarizing circuit shown in FIG. 13;

DETAILED DESCRIPTION OF THE PREFERRED EMBODIMENTS

Semiconductor integrated circuit device and IC card embodiments according to the present invention will be described in detail hereinafter with reference to the accompanying drawings.

Embodiment 1

Figure 4:
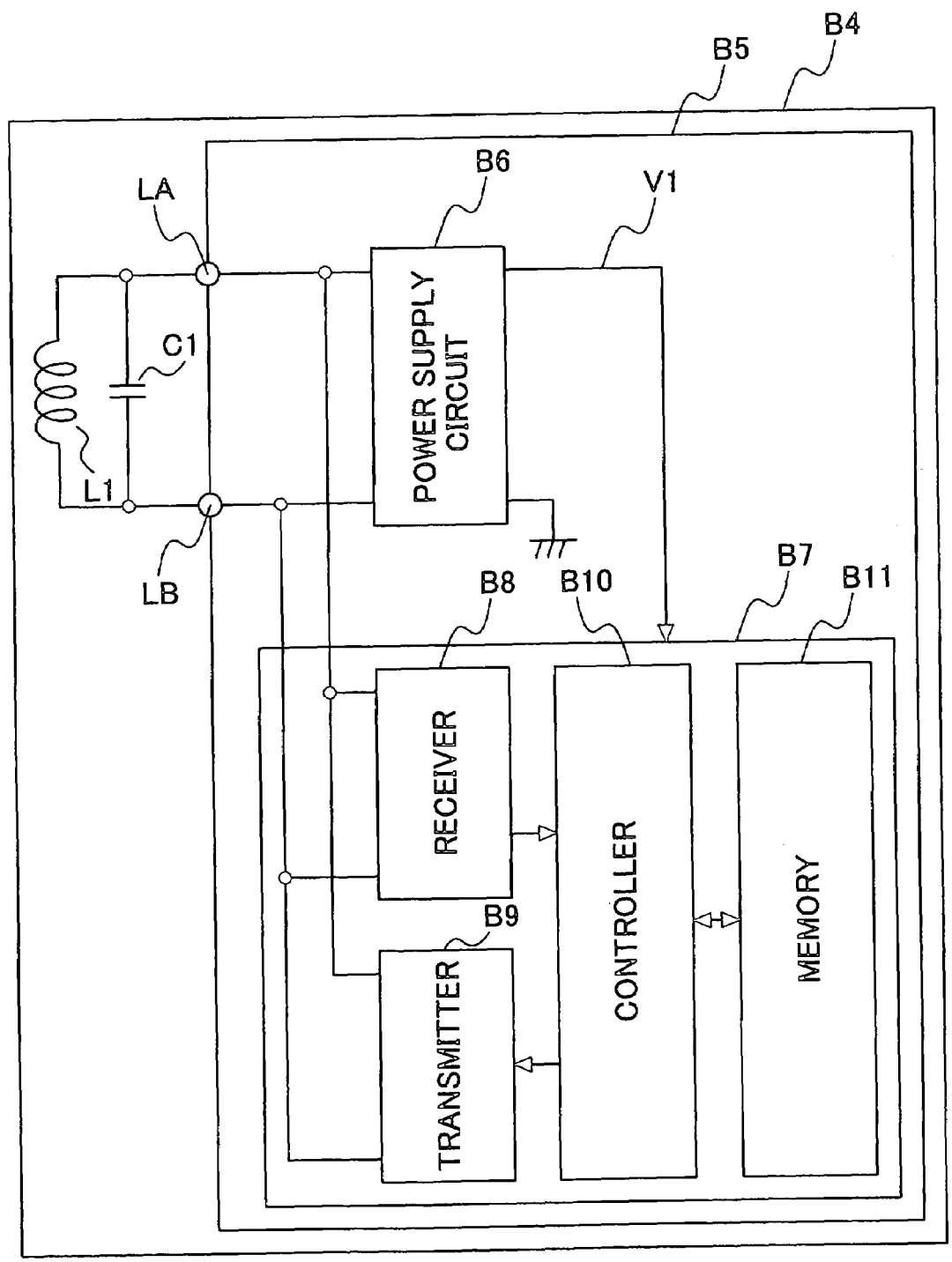
FIG. 4 shows a basic structure of a first embodiment of the semiconductor integrated circuit device and contactless IC card according to the present invention.

FIG. 4 is a block diagram showing a basic structure of a first embodiment of the semiconductor integrated circuit device and contactless IC card according to the present invention. In FIG. 4, the contactless IC card is identified by B4 and the semiconductor integrated circuit device and the antenna are identified by B5 and L1 respectively, which are mounted on the IC card B4. The antenna L1 and a capacitor C1 connected in parallel with the antenna L1 constitute a resonance circuit. The semiconductor integrated circuit device B5 is configured with a power supply circuit B6, an internal circuit B7, and antenna terminals LA and LB for the connections of the lines from the antenna L1.

Figure 5:
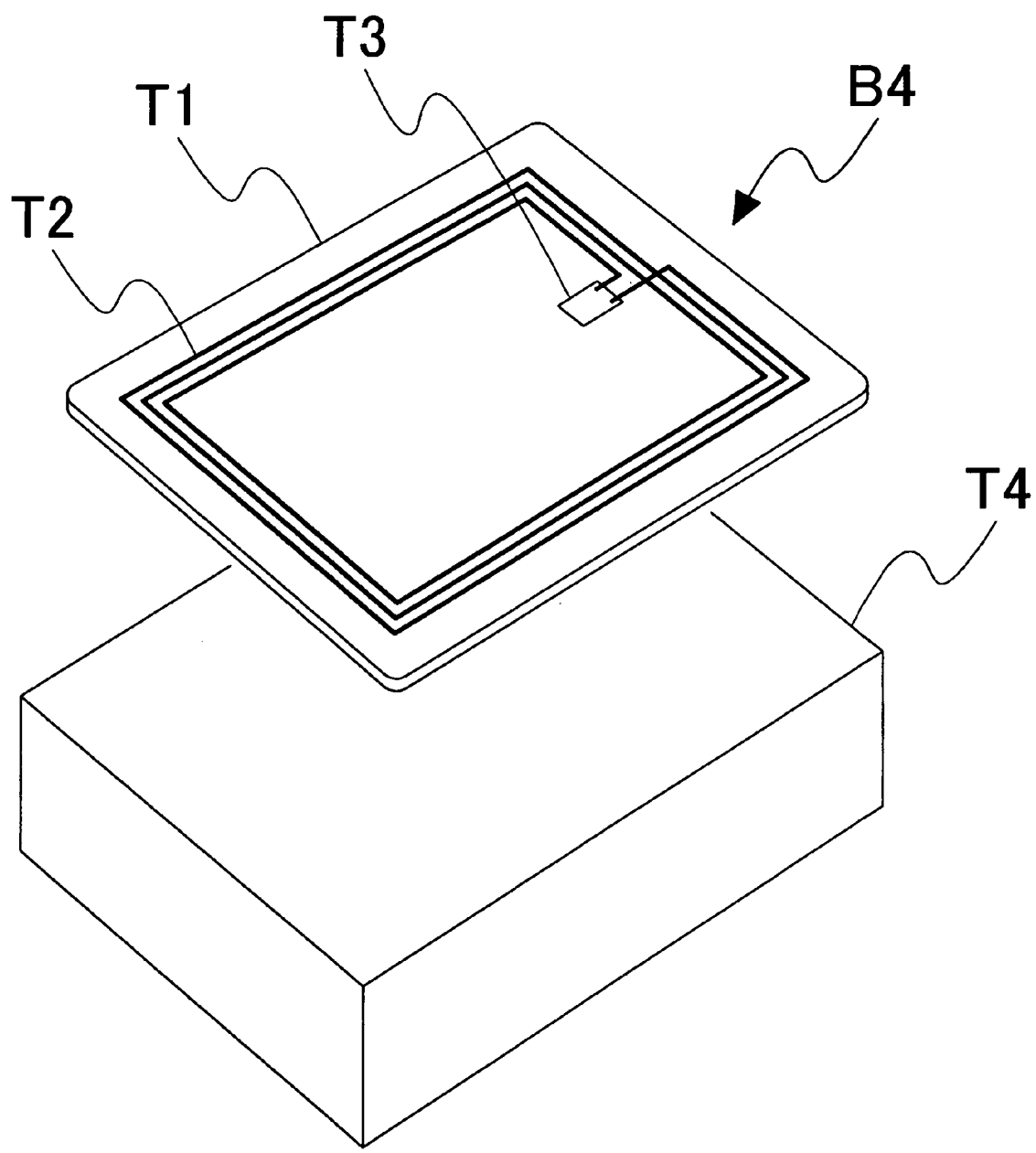
FIG. 5 is a perspective view of the wiring board of the contactless IC card having the antenna and the semiconductor integrated circuit device of the present invention and the interrogator.

FIG. 5 shows the structure of the IC card B4. The card form of the IC card B4 is given by a resin mold printed wiring board T1. The antenna L1 that receives electromagnetic waves from an external interrogator T4 is constructed in a spiral coil T2 formed by wiring on the printed wiring board T1. The semiconductor integrated circuit device B5 is constructed in a single IC chip T3 and mounted on the printed wiring board T1. The coil T2 as the antenna is connected to the IC chip T3.

The present invention is typically applied to a contactless IC card in which input and output terminals for contact with an external device are not present on the surface of the IC card. Of course, the invention may be used for a dual-type IC card with a contactless interface and terminals for input and output. The semiconductor integrated circuit device B5 is fabricated on a single semiconductor substrate such as a monocrystalline silicon substrate, using a publicly-known manufacturing technology of semiconductor integrated circuit devices, but the embodiment is not so limited.

Having received electromagnetic waves from the interrogator T4, the antenna L1 outputs a high frequency AC signal at the antenna terminals LA and LB. The AC signal is the signal that was partially modulated by an information signal (data).

Referring to FIG. 4, the power supply circuit B6 is made up of a rectifying circuit and a smoothing capacitor. The rectifying circuit rectifies and smoothes the AC signal received by the antenna L1 provided on the IC card and outputs a voltage V1. A regulator circuit may be provided to restrict the output voltage V1 less than a predetermined voltage.

The output voltage V1 of the power supply circuit B6 is supplied to the internal circuit B7 as the power supply voltage for operation. The internal circuit B7 is made up of a receiver circuit B8, a transmitter circuit B9, a controller B10, and a memory B11. The receiver circuit B8 demodulates the information signal superimposed on the AC signal received by the antenna L1 provided on the IC card into a digital information signal which is supplied to the controller B10. The transmitter circuit B9 receives a digital information signal output from the controller B10 and modules the AC signal being received by the antenna L1 with this information signal. The interrogator T4 detects a change made by this modulation in the electromagnetic waves reflected from the antenna L1 and receives the information signal from the controller B10. The memory B11 is used for storing demodulated data and transmit data transferred from the controller.

Figure 6:
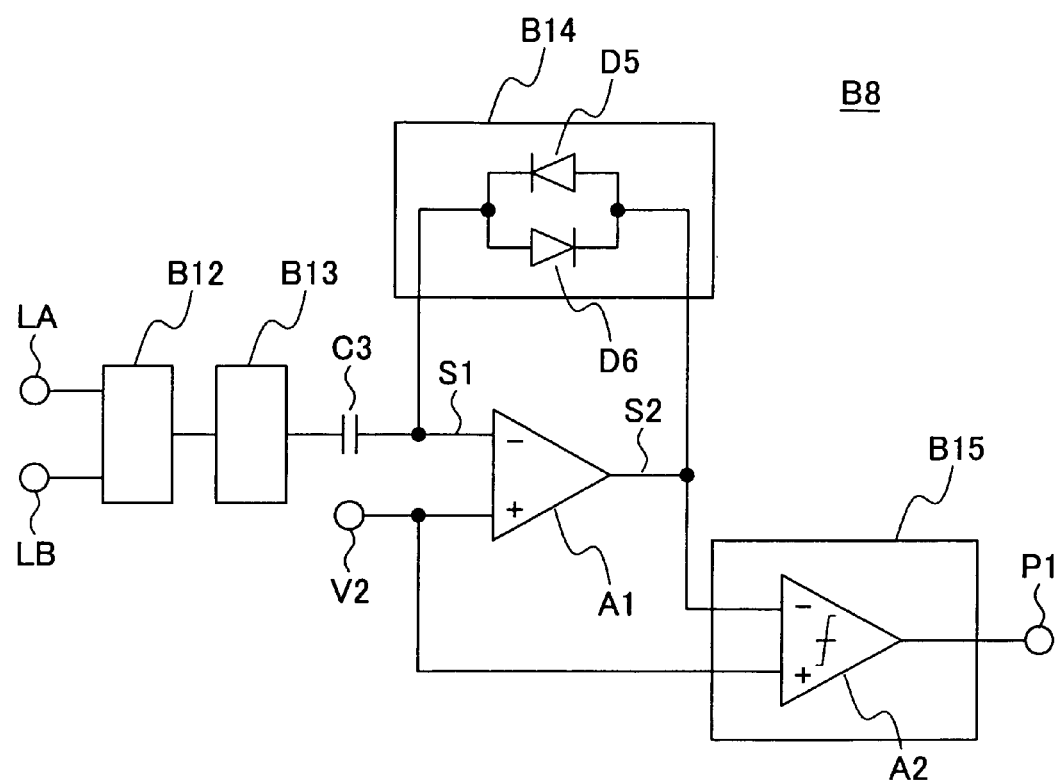
FIG. 6 is a basic circuit diagram of a receiver circuit mounted on the semiconductor integrated circuit device of Embodiment 1.

FIG. 6 shows a basic circuit diagram of the receiver circuit B8 mounted on the semiconductor integrated circuit device of the present embodiment. FIGS. 7A-7F show examples of the operating waveforms in the sections of the receiver circuit.

Figure 1:
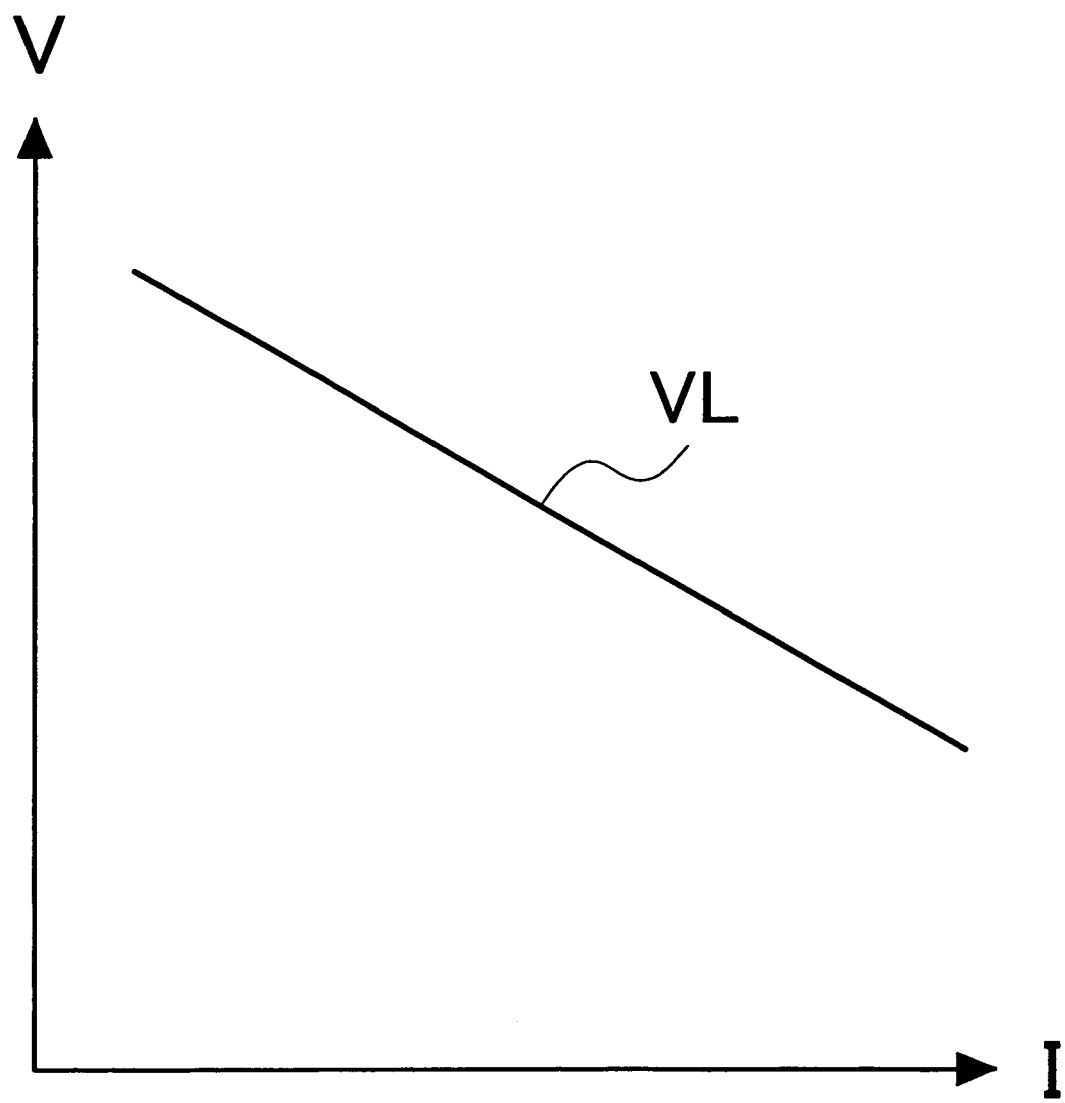
FIG. 1 is a current-voltage characteristic graph of a signal transmitted from the interrogator and received by the antenna for explaining a problem addressed by the present invention.
Figure 2:
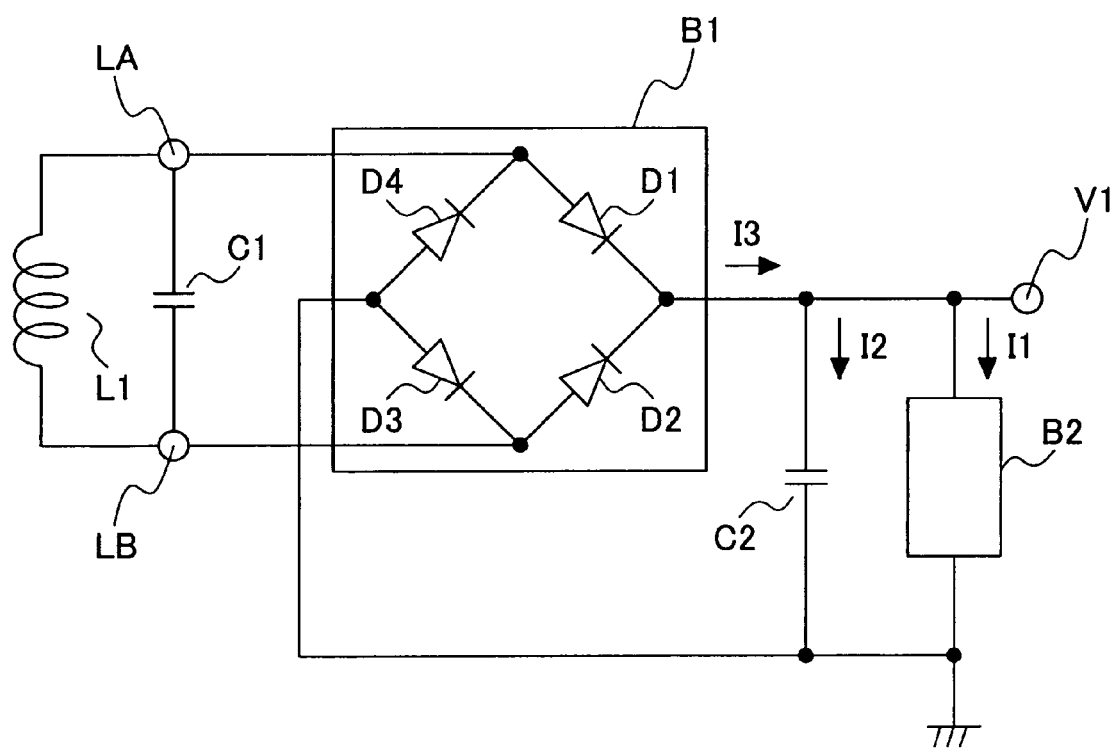
FIG. 2 is a circuitry diagram showing an example of a semiconductor integrated circuit device with a power supply circuit.
Figure 3:
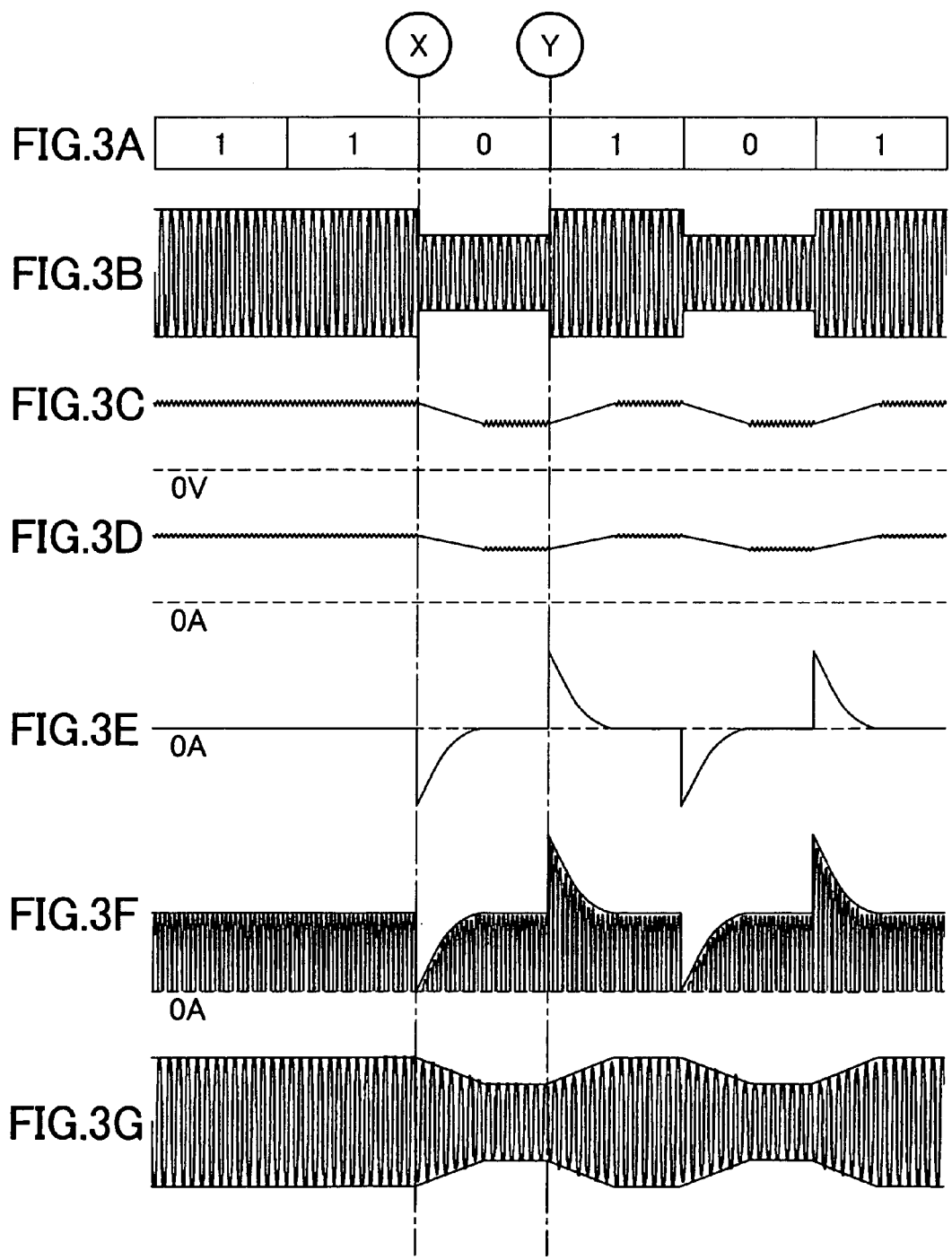
FIGS. 3A-3G show waveform charts as examples of the operating waveforms in the sections of the circuitry shown in FIG. 2.

In FIGS. 7A-7F, FIG. 7A shows data that is transmitted from the interrogator; 7B shows the voltage produced between the antenna terminals LA and LB; 7C shows the output signal of a rectifying circuit B12; 7D shows the output signal of a filter circuit B13; 7E shows a reference voltage V2, a signal S1 that is input to an inverting input terminal (−) of an operational amplifier A1, and the output signal S2 of the operational amplifier A1; and 7F shows demodulated data that is output at a terminal P1. Here, the voltage between the antenna terminals shown in 7B is the input to the receiver corresponding to the voltage between the antenna terminals shown in FIG. 3G.

The reference voltage V2 is a required constant voltage obtained by stepping down or dividing the voltage V1 supplied from the power supply circuit through, e.g., a resistor or a diode. This is also true for reference voltages V3, V6, and V7 used in Embodiments 5 and 6 which will be described later. Of course, the reference voltage may be generated by using publicly-known other circuit arrangements.

The receiver circuit B8 is made up of a rectifying circuit B12 which rectifies the AC signal, a filter circuit B13 which eliminates a high frequency component from the signal, a capacitor C3, an operational amplifier A1, a feedback path B14, and a binarizing circuit B15. The capacitor C3 is connected to be inserted between the output terminal of the filter circuit B13 and the inverting input terminal (−) of the operational amplifier A1. The feedback path B14 is connected across the output terminal and the inverting input terminal (−) of the operational amplifier A1. The feedback path B14 consists of two diodes D5 and D6 connected in parallel and oriented in reverse directions. The reference voltage V2 is input to a non-inverting input terminal (+) of the operational amplifier A1.

Although an instance where the rectifying circuit B12 is provided in the receiver circuit is shown in FIG. 6, it may be possible for the receiver to make shared use of the rectifying circuit that is a component of the power supply circuit provided on the IC card on which the semiconductor integrated circuit of the present embodiment is mounted.

The binarizing circuit B15 consists of a voltage comparator A2. The binarizing circuit B15 compares the output signal of the operational amplifier A1 with the reference voltage V2, and outputs "0" if the output signal of the operational amplifier A1 is greater than the reference voltage V2 or "1" if the output signal of the operational amplifier A1 is smaller than the reference voltage V2.

The filter circuit B13 is primarily intended to eliminate a high frequency component from the carrier and typically consists of a lowpass filter, or may consist of a bandpass filter. However, the frequency band to pass through of the filter circuit B13 must be set so as not to eliminate a frequency band of data.

Since the input impedance of the operational amplifier A1 is very large and can be ignored, at a changing point X at which the data transmitted from the interrogator T4 changes from "1" to "0," change in the negative direction does not attenuate when the signal is input to the operational amplifier A1. Therefore, as shown in FIG. 7 E, as the potential of the input signal S1 to the inverting input terminal (−) of the operational amplifier A1 goes lower than the potential V2 of the non-inverting input terminal (+), the output signal S2 of the operational amplifier A1 gets inverted. When the potential of the output signal S2 of the operational amplifier A1 becomes higher than the potential of the input signal S1 to the inverting input terminal (−) by the forward voltage of the diode D5 which is a constituent of the feedback path, current flows across the diode D5 and negative feedback occurs. By this negative feedback action, the potentials of the inverting input terminal (−) and the non-inverting input terminal (+) become stable in a state where they have an offset that is 1/A times the potential of the diode D5.

Conversely, at a changing point Y at which the data transmitted from the interrogator T4 changes from "0" to "1," change in the positive direction does not attenuate when the signal is input to the operational amplifier A1. Therefore, as the potential of the input signal S1 to the inverting input terminal (−) of the operational amplifier A1 goes higher than the potential V2 of the non-inverting input terminal (+), the output signal of the operational amplifier A1 gets inverted. When the potential of the output signal of the operational amplifier A1 becomes lower than the potential of the input signal S1 to the inverting input terminal (−) by the forward voltage of the diode D6 which is a constituent of the feedback path, current flows across the diode D6 and negative feedback occurs. By this negative feedback action, the potentials of the inverting input terminal (−) and the non-inverting input terminal (+) become stable in a state where they have an offset that is 1/A times the potential of the diode D6.

The output signal amplified by the operational amplifier A1 and the diodes D5 and D6 is binarized through the binarizing circuit B15 and the data transmitted from the interrogator T4 can thus be demodulated.

Here, the feedback path B14 from the output terminal to the inverting input terminal (−) of the operational amplifier A1 consists of the diodes D5 and D6. If this feedback path is replaced by a resistor, the capacitor C3, the operational amplifier A1, and the feedback path B14 will constitute a circuit that is known as a differentiation circuit. In this case, a low frequency component is eliminated from the output signal from the filter circuit B13 and cannot be amplified. In fact, by using the diodes D5 and D6 to form the feedback path, the low frequency component of the output signal from the filter circuit B13 can be amplified without being eliminated.

Even in the case where a high frequency component was removed from data transmitted from the interrogator due to a large load connected between power supply terminals, the above operation can improve data signal amplification, so that binarization in the following stage will be facilitated and correctly demodulated data can be generated.

Embodiment 2

Figure 8:
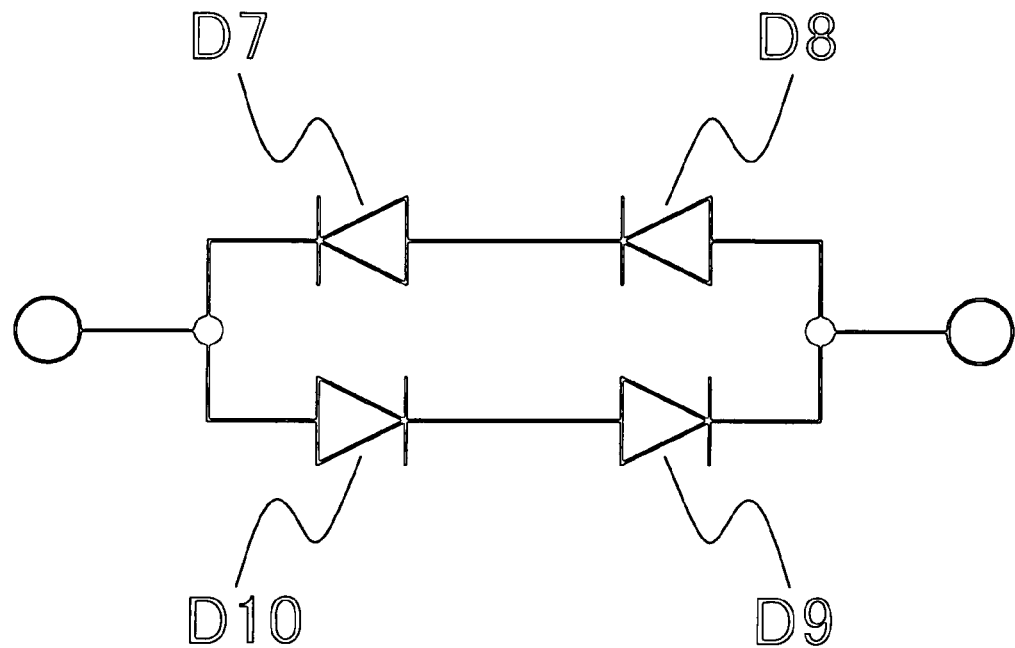
FIG. 8 is a diagram showing another configuration of a feedback path shown in FIG. 6.

FIG. 8 is a circuit diagram showing another configuration of the feedback path which is a constituent of the receiver circuit in the semiconductor integrated circuit device discussed in Embodiment 1. The feedback path of this embodiment is configured such that two chains of diodes are connected in parallel and oriented in mutually reverse directions, and in each chain, a plurality of diodes are connected in series. In FIG. 8, by way of example, two diode chains, in one of which two diodes D7 and D8 are connected in series, and in the other of which two diodes D9 and D10 are connected in series, are connected in parallel and oriented in reverse directions.

The output signal of the operational amplifier A1 in FIG. 6 has amplitude that is about double the forward voltage of a PN-junction diode, relative to the reference voltage V2. On the other hand, by using the feedback path configuration of this embodiment, the amplitude of the output signal of the operational amplifier A1 becomes greater, which facilitates the operation of the binarizing circuit connected in the following stage.

Embodiment 3

Figure 9:
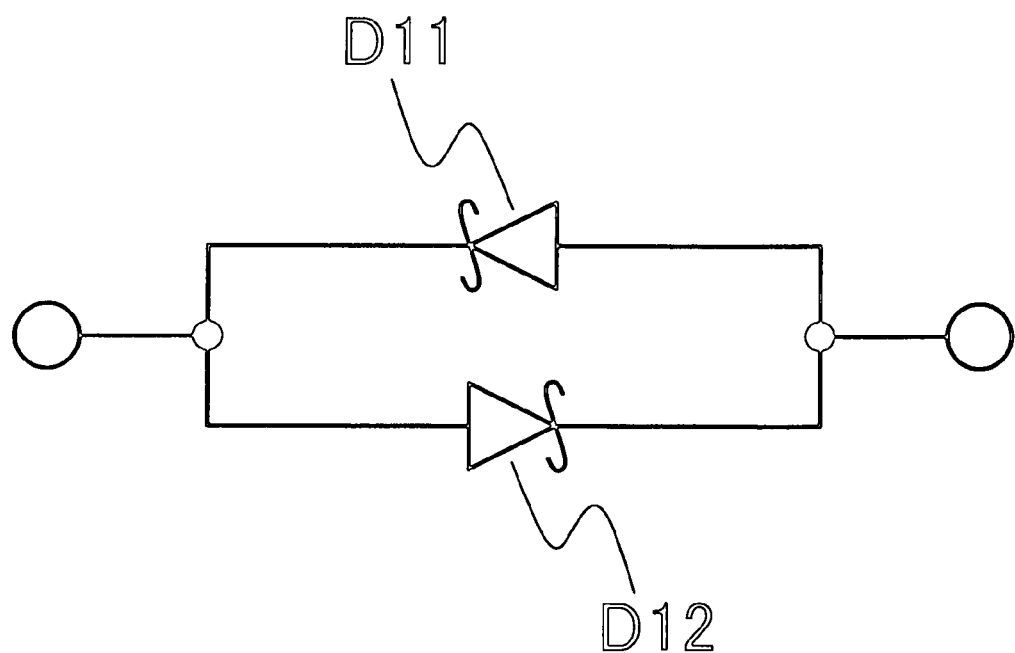
FIG. 9 is a circuit diagram showing yet another configuration of the feedback path shown in FIG. 6.

FIG. 9 is a circuit diagram showing yet another configuration of the feedback path which is a constituent of the receiver circuit in the semiconductor integrated circuit device discussed in Embodiment 1.

Since the output voltage of the operational amplifier A1 changes, relative to the reference voltage V2, the minimum operating voltage of the receiver circuit in FIG. 6 can be expressed by the sum of the value of the reference voltage V2 and the forward voltage VF of the diode D5.

In this embodiment, the feedback path B14 in FIG. 6 is configured with Schottky barrier diodes D11 and D12 instead of the PN-junction diodes D5 and D6. In general, the forward voltage of Schottky barrier diodes is smaller than that of PN-junction diodes. Therefore, by using the Schottky barrier diodes instead of the PN-junction diodes, it becomes possible to lower the minimum operating voltage of the receiver circuit.

Embodiment 4

Figure 10:
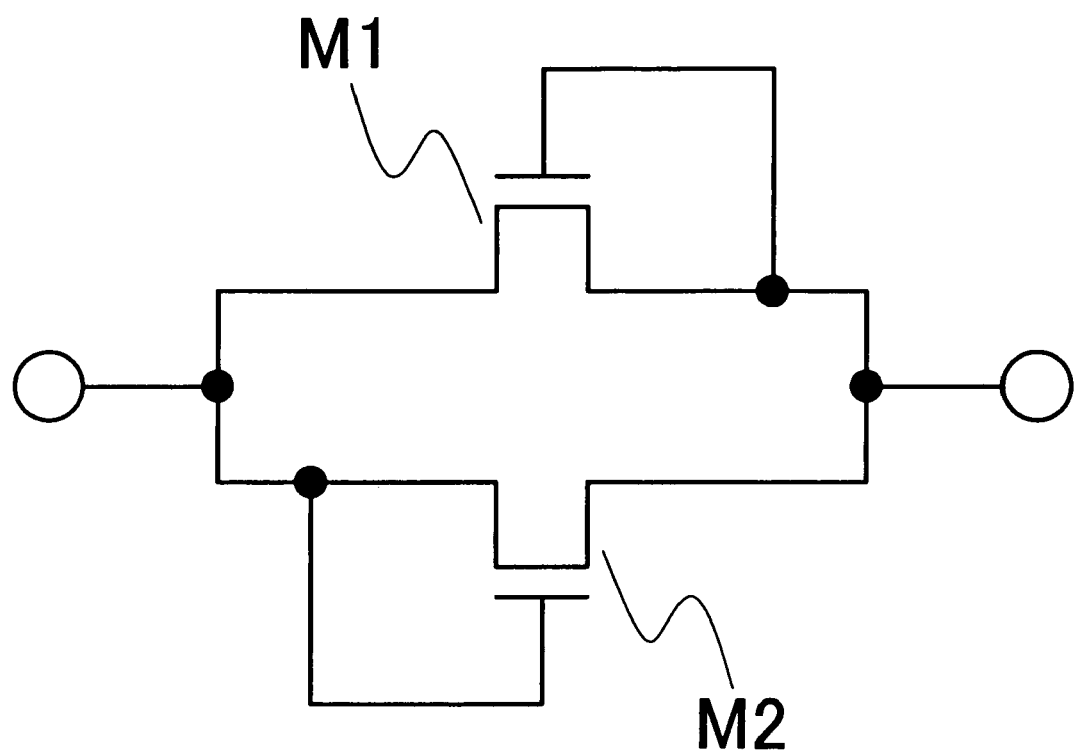
FIG. 10 is a circuit diagram showing a further configuration of the feedback path shown in FIG. 6.

FIG. 10 is a circuit diagram showing a further configuration of the feedback path which is a constituent of the receiver circuit in the semiconductor integrated circuit device discussed in Embodiment 1.

In this embodiment, the feedback path is configured with drain-gate connected MOS transistors (hereinafter referred to as "MOS diodes") M1 and M2. In the semiconductor manufacturing process, it is not easy to adjust the forward voltage of PN-junction diodes, but the threshold voltage of MOS transistors in the forward direction can be fine adjusted, e.g., by adjusting the gate length or width of a MOS transistor. Therefore, by using the MOS diodes instead of the diodes D5 and D6 to form the feedback path B14 in FIG. 6, the forward voltage of the MOS diodes can be fine adjusted, because the threshold voltage can be adjusted. Particularly in a situation where it is desired to decrease the forward direction, the minimum operating voltage can be lowered, as is the case in the embodiment shown in FIG. 9.

Another way of adjusting the threshold voltage of a MOS transistor besides those mentioned above is controlling the dose amount of ion implanting into a channel region of the MOS transistor in the semiconductor manufacturing process; this can adjust the threshold voltage easily.

As compared with forming Schottky barrier diodes on the same semiconductor substrate, adjusting the threshold voltage of the MOS transistors is easier and the chip area can be reduced, because these MOS transistors can be disposed coordinately with other MOS transistors.

Embodiment 5

Figure 11:
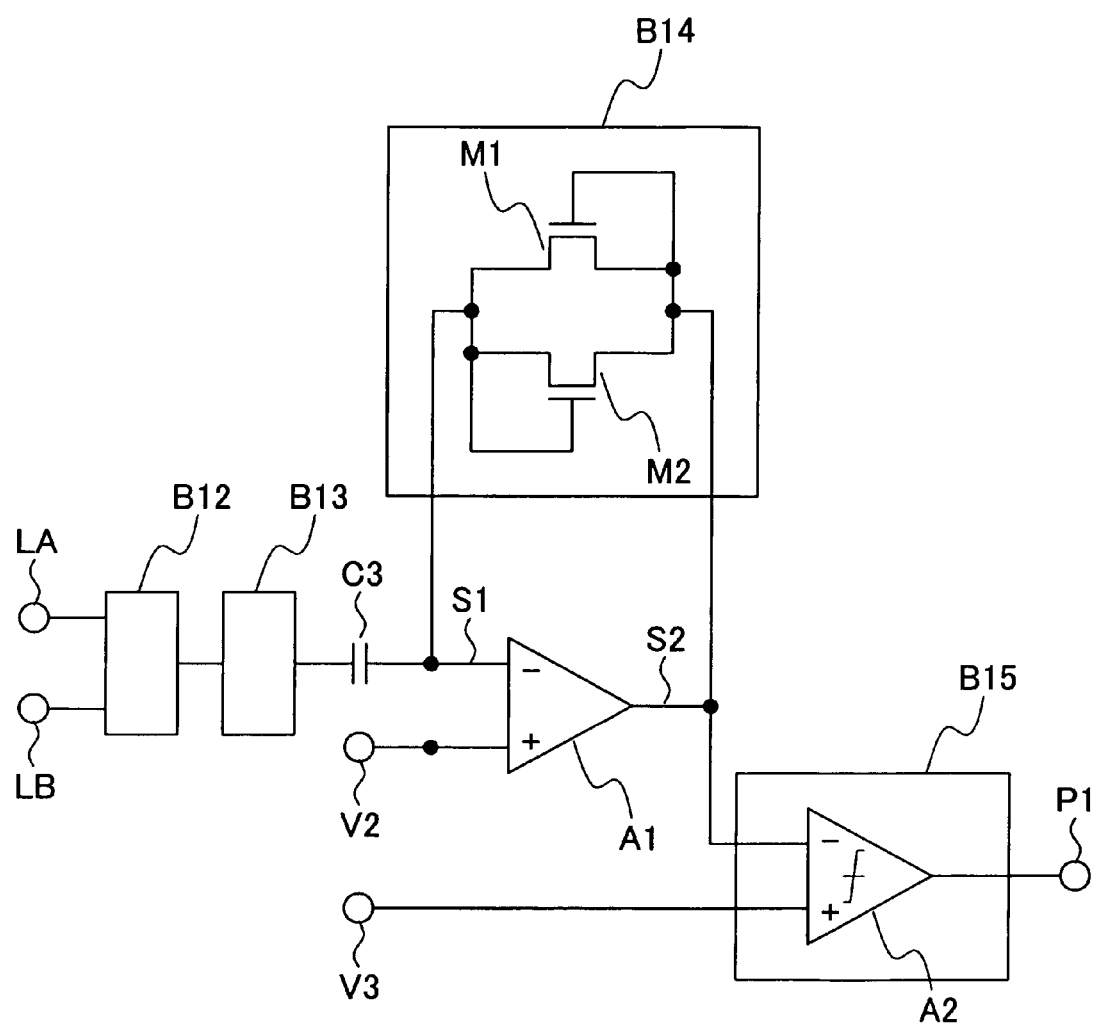
FIG. 11 is a block diagram showing another configuration of the receiver circuit in the semiconductor integrated circuit device according to the present invention.
Figure 12:
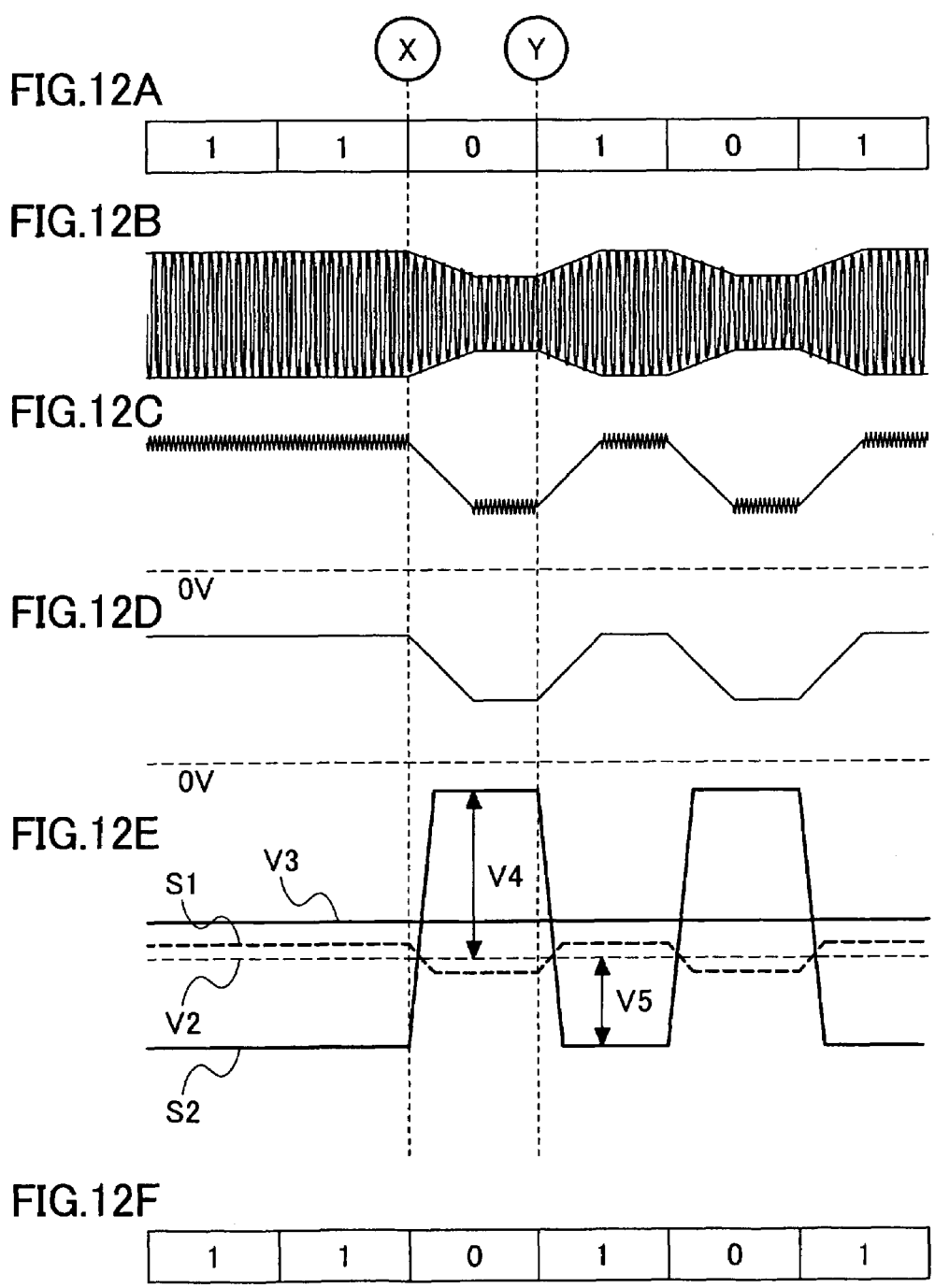
FIGS. 12A-12F show waveform charts as examples of the operating waveforms in the sections of the receiver circuit shown in FIG. 11.

FIG. 11 is a block diagram showing another configuration of the receiver circuit in the semiconductor integrated circuit device according to the present invention. FIGS. 12A-12F show examples of the operating waveforms in the sections of the receiver circuit. The structure of the contactless IC card on which the semiconductor integrated circuit device of this embodiment is mounted is the same as shown in FIG. 5 for Embodiment 1.

In FIGS. 12A-12F, FIG. 12A shows data that is transmitted from the interrogator; 12B shows the voltage produced between the antenna terminals LA and LB; 12C shows the output signal of the rectifying circuit B12; 12D shows the output signal of the filter circuit B13; 12E shows reference voltages V2, V3, a signal S1 that is input to the inverting input terminal (−) of the operational amplifier A1, and the output signal S2 of the operational amplifier A1; and 12F shows demodulated data that is output at the terminal P1.

The receiver circuit shown in FIG. 11 employs the feedback path consisting of the drain-gate connected MOS diodes M1 and M2 shown in FIG. 10 as the feedback path B14 in FIG. 6.

At the changing point X at which the data transmitted from the interrogator changes from "1" to "0," the output signal of the operational amplifier A1 gets inverted and negative feedback through the MOS diode M1 occurs, as described for FIGS. 6 and 7A-7F. At this time, the source terminal of the MOS transistor M1 is the inverting input terminal (−) of the operational amplifier A1 and the source potential of the MOS transistor M1 becomes substantially the same as the potential of the reference voltage V2.

At the changing point Y at which the data transmitted from the interrogator changes from "0" to "1," negative feedback through the MOS diode M2 occurs. At this time, the source terminal of the MOS transistor M2 is the output terminal of the operational amplifier A1 and the source potential of the MOS transistor M2 becomes lower than the reference voltage V2 by the gate-source voltage of the MOS transistor M2.

In consequence of the above actions, the source potential when the MOS diode M1 turns ON differs from the source potential when the MOS diode M2 turns ON and the MOS transistors have different threshold voltages due to the substrate effects thereof. Thus, the potential difference V4 of the inverting input terminal (−) of the operational amplifier A1 differs from the potential difference V5 of the output terminal, which might result in duty ratio deviation of data signals and failure to receive normally by the binarizing circuit B15 shown in FIG. 6.

Thus, a reference voltage V3 is input to the voltage comparator A2 which forms the binarizing circuit B15, as shown in FIG. 11, and the binarizing circuit outputs "0" if the output signal of the operational amplifier A1 is greater than the reference voltage V3 or "1" if the output signal of the operational amplifier A1 is smaller than the reference voltage V3. Thereby, data signal duty ratios deviated due to the substrate effects of the MOS transistors M1 and M2 can be corrected.

Embodiment 6

Figure 13:
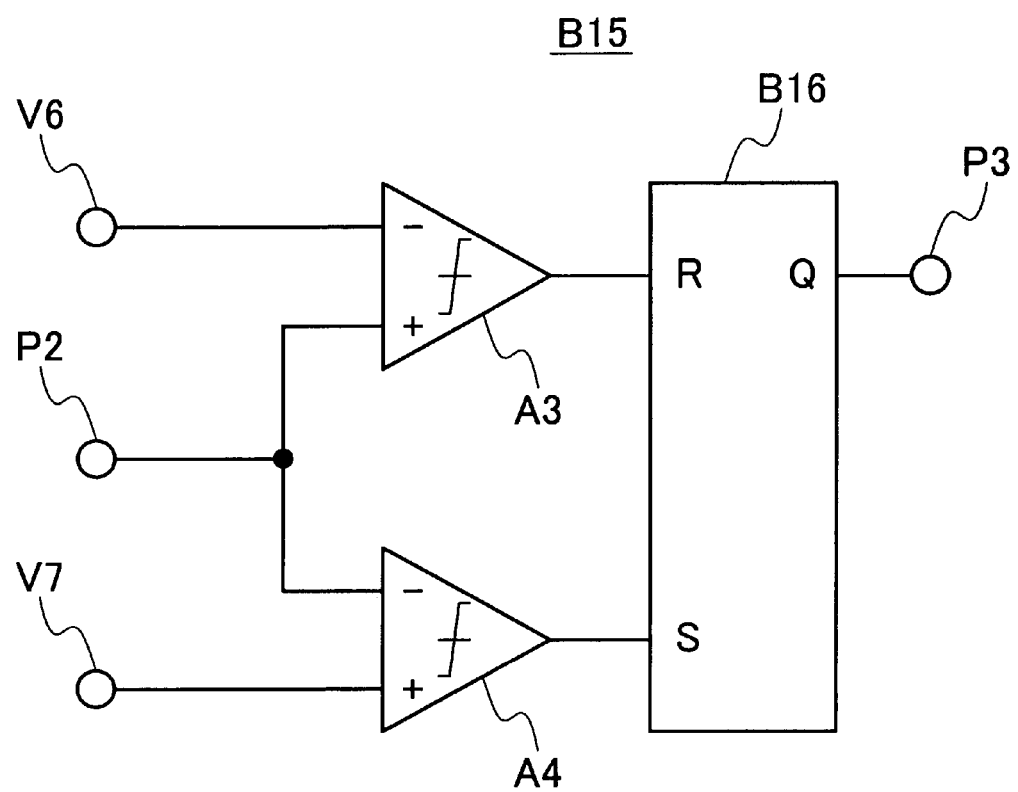
FIG. 13 is a circuit diagram showing another configuration of a binarizing circuit which is a constituent of the receiver circuit and shown in FIG. 6 and FIG. 11.

FIG. 13 is a circuit diagram showing another configuration of the binarizing circuit B15 which is a constituent of the receiver circuit in the semiconductor integrated circuit device and shown in FIG. 6 for Embodiment 1 and FIG. 11 for Embodiment 5. FIGS. 14A-14D show examples of the operating waveforms in the sections of the binarizing circuit.

In FIG. 14A-14D, FIG. 14A shows an input signal that is input to an input terminal P2 and reference voltages V6 and V7; 14B shows the output signal of a voltage comparator A3; 14C shows the output signal of a voltage comparator A4; and 14D shows demodulated data output at a terminal P3

Referring to FIG. 13, the binarizing circuit B15 is made up of voltage comparators A3 and A4, and a flip-flop circuit B16. A signal input to the input terminal P2 and the reference voltage V6 are input to the voltage comparator A3 and the voltage comparator A3 outputs "1" if the input signal is greater than the reference voltage V6 or "0" if the input signal is smaller than the reference voltage V6.

The signal input to the input terminal P2 and the reference voltage V7 are input to the voltage comparator A4 and the voltage comparator A4 outputs "0" if the input signal is greater than the reference voltage V7 or "1" if the input signal is smaller than the reference voltage V7. The output signal of the voltage comparator A4 is input to a set terminal S of the flip-flop circuit B16 and the output signal of the voltage comparator A3 is input to a reset terminal R.

By defining that a "0" value of transmitted data is obtained during a period from a time when the output signal of the voltage comparator A4 changes from "0" to "1" to a time when the output signal of the voltage comparator A3 changes from "0" to "1" and that a "1" value of transmitted data is obtained during a period from a time when the output signal of the voltage comparator A3 changes from "0" to "1" to a time when the output signal of the voltage comparator A4 changes form "0" to "1," demodulated data is output from the output terminal P3. By applying hysteresis with two reference voltages in this way, duty deviation of data signals can be reduced. Hysteresis width can be arbitrarily set by setting the reference voltages V6 and V7.

While the invention made by the present inventors has been described specifically, based on its preferred embodiments, it will be appreciated that the present invention is not limited to the illustrative embodiments described hereinbefore and may be embodied in other modified forms of design without departing from its spirit or essential characteristics. For instance, by connecting a plurality of Schottky barrier diodes in series, the forward voltage can be fine adjusted.

In constructing the contactless IC card shown in FIG. 4, alternatively, the power supply circuit, receiver circuit, transmitter circuit, controller, and memory may be implemented in a plurality of semiconductor integrated circuit devices. The preset invention can be broadly applied to a semiconductor integrated circuit device that generates its internal voltage by rectifying and smoothing AC voltage, and a contactless IC card on which the semiconductor integrated circuit device is mounted.

Advantageous effect produced by a typical aspect of the present invention disclosed herein will be summarized as follows.

The receiver circuit mounted on the semiconductor integrated circuit device according to the present invention is able to stably demodulate information signals superimposed on AC signals received by the antenna and fed to the antenna terminals without being affected by the rectifying circuit characteristics and the consumption current of an internal circuit that operates on the output voltage of the rectifying circuit.

The contactless IC card having the above semiconductor integrated circuit device and the antenna coil is able to stably demodulate ASK-modulated signals radioed from the interrogator without being affected by other functions and the consumption current of a circuit included in the IC card and the capacitor or the like connected between the power supply terminals.

What is claimed is:

1. A dual-type IC card comprising:
   terminals for input and output which are not present on a surface of the dual-type IC card;
   a coil that forms an antenna; and
   a semiconductor integrated circuit device including a receiver circuit that demodulates an information signal superimposed on an AC signal received through the antenna,
   wherein said receiver circuit comprising:
   antenna terminals which are connected to said antenna;
   a rectifying circuit which rectifies and smoothes said AC signal fed from said antenna to said antenna terminals;
   a filter circuit which eliminates a high frequency component from an output signal of said rectifying circuit;
   a capacitor;
   an operational amplifier with a non-inverting input to which a first reference voltage is input;
   a feedback path; and a binarizing circuit, wherein an output signal of said filter circuit is input via said capacitor to an inverting input of said operational amplifier, and wherein an output signal of said operational amplifier is fed back through said feedback path to the inverting input terminal of said operational amplifier and then input to said binarizing circuit.

2. The dual-type IC card according to claim 1, wherein said feedback path comprises a first diode and a second diode, both being connected in parallel and oriented in reverse directions.

3. The dual-type IC card according to claim 2, wherein said first and second diodes are Schottky barrier diodes.

4. The dual-type IC card according to claim 2, wherein said first diode and said second diode are constructed from drain-gate connected MOS transistors.

5. The dual-type IC card according to claim 1, wherein said binarizing circuit comprises a voltage comparator to which said first reference voltage and the output signal of said operational amplifier are input.

6. The dual-type IC card according to claim 1, wherein said binarizing circuit comprises a voltage comparator to which a second reference voltage and an output voltage of said operational amplifier are input.

7. The dual-type IC card according to claim 1, wherein said binarizing circuit comprises a first voltage comparator to which a third reference voltage and the output voltage of said operational amplifier are input, a second comparator to which a fourth reference voltage and the output voltage of said operational amplifier are input, and a flip-flop circuit which changes the level of its output terminal voltage depending on said first voltage comparator output signal and said second voltage comparator output signal.

8. The dual-type IC card according to claim 1, wherein said feedback path comprises first diodes connected in the same direction and second diodes connected in the same direction, and said first diodes and second diodes are connected in parallel and oriented in reverse directions.

9. A contactless IC card comprising:

a coil that forms an antenna; and semiconductor integrated circuit device including a receiver circuit that demodulates an information signal superimposed on an AC signal received through the antenna, wherein said receiver circuit includes:

antenna terminals which are connected to said antenna;

a rectifying circuit which rectifies and smoothes said AC signal fed from said antenna to said antenna terminals;

a filter circuit which eliminates a high and low frequency component from an output signal of said rectifying circuit;

a capacitor;

an operational amplifier with a non-inverting input to which a first reference voltage is input;

a feedback path; and a binarizing circuit, wherein an output signal of said filter circuit is input via said capacitor to an inverting input of said operational amplifier, and wherein an output signal of said operational amplifier is fed back through said feedback path to the inverting input terminal of said operational amplifier and then input to said binarizing circuit.

10. The contactless IC card according to claim 9, wherein said feedback path comprises a first diode and a second diode, both being connected in parallel and oriented in reverse directions.

11. The contactless IC card according to claim 10, wherein said first and second diodes are Schottky baffler diodes.

12. The contactless IC card according to claim 10, wherein said first diode and said second diode are constructed from drain-gate connected MOS transistors.

13. The contactless IC card according to claim 9, wherein said binarizing circuit comprises a voltage comparator to which said first reference voltage and the output signal of said operational amplifier are input.

14. The contactless IC card according to claim 9, said binarizing circuit comprises a voltage comparator to which a second reference voltage and an output voltage of said operational amplifier are input.

15. The contactless IC card according to claim 9, said binarizing circuit comprises a first voltage comparator to which a third reference voltage and the output voltage of said operational amplifier are input, a second comparator to which a fourth reference voltage and the output voltage of said operational amplifier are input, and a flip-flop circuit which changes the level of its output terminal voltage depending on said first voltage comparator output signal and said second voltage comparator output signal.

16. The contactless IC card according to claim 9, wherein said feedback path comprises first diodes connected in the same direction and second diodes connected in the same direction, and said first diodes and second diodes are connected in parallel and oriented in reverse directions.

* * * * *